(12) United States Patent
Minta et al.

(10) Patent No.: US 11,536,152 B2
(45) Date of Patent: Dec. 27, 2022

(54) VALVE ASSEMBLY FOR AN ACTIVE CLEARANCE CONTROL SYSTEM

(71) Applicant: Hamilton Sundstrand Corporation, Charlotte, NC (US)

(72) Inventors: Zbigniew Minta, Wroclaw (PL); Wojciech Pluciński, Września (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 182 days.

(21) Appl. No.: 17/130,670

(22) Filed: Dec. 22, 2020

(65) Prior Publication Data

US 2021/0189900 A1    Jun. 24, 2021

(30) Foreign Application Priority Data

Dec. 23, 2019   (EP) .................................... 19461619

(51) Int. Cl.
*F01D 17/14*   (2006.01)
*F01D 11/24*   (2006.01)
(Continued)

(52) U.S. Cl.
CPC ............ *F01D 11/24* (2013.01); *F01D 17/145* (2013.01); *F01D 17/148* (2013.01); *F16K 1/18* (2013.01);
(Continued)

(58) Field of Classification Search
CPC ........ F01D 17/148; F01D 11/24; F16K 1/223; F16K 1/54; F16K 27/0218;
(Continued)

(56) References Cited

U.S. PATENT DOCUMENTS 1,671,069 A * 5/1928 De Wein .................. F16K 1/22
251/305
3,154,917 A   11/1964 Williamson
(Continued)

FOREIGN PATENT DOCUMENTS

EP   2175180 B1   8/2011
EP   3163053 A1   9/2016
(Continued)

OTHER PUBLICATIONS

European Search Report for Application No. 19461619.9, dated May 20, 2020, 5 pages.

*Primary Examiner* — Michael R Reid
(74) *Attorney, Agent, or Firm* — Cantor Colburn LLP (57) ABSTRACT

A valve assembly for an active clearance control (ACC) system in a gas turbine engine. The assembly comprises a first valve disc positioned within a first outlet duct, a second valve disc positioned within the second outlet duct, and a shaft coupled to the first and second valve discs such that rotation of the shaft rotates both the first and second valve discs within the first and second outlet ducts, respectively. A flow control member in the second outlet duct surrounds the second valve disc, and is configured to restrict fluid flow passing through the second outlet duct to a greater extent (Continued)

than the fluid flow passing through the first outlet duct for a given degree of rotation of the first and second valve discs. A corresponding ACC system, gas turbine and method is also provided.

16 Claims, 9 Drawing Sheets

(51) Int. Cl.
*F16K 27/02* (2006.01)
*F16K 1/22* (2006.01)
*F16K 1/18* (2006.01)
*F16K 1/54* (2006.01)
*B33Y 80/00* (2015.01)

(52) U.S. Cl.
CPC ............. *F16K 1/22* (2013.01); *F16K 1/223* (2013.01); *F16K 1/54* (2013.01); *F16K 27/0218* (2013.01); *F16K 27/0263* (2013.01); *B33Y 80/00* (2014.12); *F05D 2230/31* (2013.01); *F05D 2240/60* (2013.01); *F05D 2260/232* (2013.01)

(58) Field of Classification Search
CPC ..... F16K 27/270263; Y10T 137/87129; Y10T 137/87708; Y10T 137/8782; Y10T 137/87161
See application file for complete search history.

(56) References Cited

U.S. PATENT DOCUMENTS

| | | | |
|---|---|---|---|
| 4,329,114 A | | 5/1982 | Johnston et al. |
| 4,512,372 A | * | 4/1985 | Lew .................... F16K 11/0525 251/162 |
| 5,427,141 A | * | 6/1995 | Ohtsubo ............... F02D 9/1095 137/862 |
| 5,899,805 A | | 5/1999 | Dowod et al. |
| 6,138,988 A | | 10/2000 | Bouvet et al. |
| 7,325,569 B2 | | 2/2008 | Denike et al. |
| 8,307,853 B2 | | 11/2012 | Bizzarro |
| 8,616,242 B2 | * | 12/2013 | Buseyne .................. F16K 1/54 366/338 |
| 10,787,993 B2 | * | 9/2020 | Karasawa ................ F01N 5/02 |
| 2007/0063163 A1 | | 3/2007 | Yeary et al. |
| 2013/0283762 A1 | | 10/2013 | Simpson et al. |
| 2019/0145315 A1 | | 5/2019 | Dow |

FOREIGN PATENT DOCUMENTS

| | | |
|---|---|---|
| WO | 9211444 | 7/1992 |
| WO | 2016160760 A1 | 10/2016 |

* cited by examiner

VALVE ASSEMBLY FOR AN ACTIVE CLEARANCE CONTROL SYSTEM

FOREIGN PRIORITY

This application claims priority to European Patent Application No. 19461619.9 filed Dec. 23, 2019, the entire contents of which is incorporated herein by reference.

TECHNICAL FIELD

This disclosure relates generally to a valve assembly for an active clearance control system. This disclosure also relates to an active clearance control system, a gas turbine engine, and a method of controlling flow rate in an active clearance control system for a gas turbine engine.

BACKGROUND

During operation of a gas turbine engine, temperature and forces within the engine can cause parts of the engine to expand and contract. When designing engine turbines, it is desirable for the clearance between the turbine case and the turbine blades to be as low as possible without the blades contacting the case in order to optimise turbine efficiency. This efficiency gain can result in the reduction of engine fuel burn and consequently emissions. However, because the turbine case and turbine blades can expand and contract at different rates, optimum efficiency can be difficult to achieve using conventional design techniques.

Active clearance control (ACC) systems have been developed for engine turbines, which provide cooling air to the turbine case to optimise the clearance between the turbine case and the blades during engine operation. A prior art ACC system is disclosed in U.S. Pat. No. 4,329,114.

Different areas of the turbine case, for example a high pressure turbine (HPT) case section and a low pressure turbine (LPT) case section may require different amounts of cooling air to achieve the desired clearance control therein, due to the different temperature levels experienced therein. There can be a predetermined flow relationship between the airflow required at such different areas for a given engine operating condition.

Different types of mechanisms can be used to perform the function of controlling the differential cooling airflows supplied to different turbine case sections. For example, two separate and independent ACC systems can be used to direct cooling airflow to each casing section or a single ACC system can be used with a valve assembly that can direct separate airflows to each section at an appropriate differential flow rate. As will be understood by the skilled person, such a valve assembly may necessarily include multiple valve elements in the ACC system that can be driven to open at differential rates in order to supply the correct differential cooling airflow. This assembly, for example, may contain multiple actuators, gears and/or cam mechanisms that allow this driving of the multiple valve elements.

Such assemblies may be relatively complex and may require frequent maintenance. They may also not be readily adaptable for controlling more complex cooling flow relationships without adding further complexity and weight to the assembly and system. It would be desirable to provide a valve assembly with fewer parts, reduced weight and improved capability for controlling complex flow relationships compared with the ACC system valve assemblies discussed above.

SUMMARY

From a first aspect, the present disclosure provides a valve assembly for an active clearance control (ACC) system in a gas turbine engine. The assembly comprises a housing that defines an annular inlet duct having a central inlet axis, a first annular outlet duct having a first central outlet axis, and a second annular outlet duct having a second central outlet axis. The inlet duct is configured to direct a flow of fluid to the first outlet duct and the second outlet duct. The assembly also comprises a first valve disc positioned within the first outlet duct, a second valve disc positioned within the second outlet duct, and a shaft coupled to the first and second valve discs. Rotation of the shaft rotates both the first and second valve discs within the first and second outlet ducts, respectively. The first and second valve discs are configured to rotate between a first closed position and a second fully-open position to vary the amount of fluid flow permitted through the first and second outlet ducts. This rotation varies the amount of fluid flow permitted through the first and second outlet ducts. The assembly also comprises a flow control member in the second outlet duct surrounding the second valve disc, which is configured to restrict fluid flow passing through the second outlet duct to a greater extent than the fluid flow passing through the first outlet duct for a given degree of rotation of the first and second valve discs from the first position.

It is to be appreciated that the first "closed" position corresponds to a valve disc position where no or minimal intended fluid flow is permitted through the outlet ducts by the valve discs during operation, and the second "fully-open" position corresponds to a valve disc position where a maximum intended fluid flow is permitted through the outlet ducts by the valve discs during operation.

In an embodiment of the above aspect, the flow control member comprises at least one flow restricting portion that is configured to provide a reduced fluid flow area between the second valve disc and the flow control member compared to the fluid flow area between the first valve disc and a portion of the first outlet duct surrounding the first valve disc, for a given degree of rotation of the first and second valve discs from the first position.

In a further embodiment of the above, the at least one flow restricting portion is shaped to provide a predetermined differential relationship between the amount of fluid flow allowed to pass through the first outlet duct and the second outlet duct depending on the degree of rotation of the first and second valve discs from the first position.

In yet a further embodiment of the above, the at least one flow restricting portion includes at least one notch that is configured to provide a step increase in flow area between the second valve disc and the flow control member at a predetermined angle of rotation of the second valve disc from the first position.

In a further embodiment of any of the above, the first central outlet axis is disposed at a first acute angle relative to the central inlet axis, and the second central outlet axis is disposed at a second acute angle relative to the central inlet axis. The second acute angle is equal and opposite to the first acute angle.

In a further embodiment of the above, the shaft defines a central shaft axis that is perpendicular to the central inlet axis, and the shaft extends across the first and second and outlet ducts.

In a further embodiment of the above, the shaft is rotatably mounted to the housing at two opposing openings through the housing. In an alternative embodiment, the shaft is rotatably mounted to the housing at a single opening through the housing.

In a further embodiment of any of the above, the flow control member is an insert that is disposed in the second outlet duct.

In a further embodiment of the above, the insert is formed by additive manufacturing.

In an alternative embodiment to the above, the flow control member is integrally formed with the housing.

In a further embodiment of the above, the housing and integral flow control member are formed (i.e. together) by additive manufacturing.

In a further embodiment of any of the above, the assembly further comprises an actuator operatively connected to the shaft, and configured to rotate the shaft in response to actuation.

From a second aspect, the present disclosure provides an active clearance control (ACC) system for a gas turbine engine. The system comprises the valve assembly of any of the embodiments of the first aspect.

From a third aspect, the present disclosure provides a gas turbine engine comprising the active clearance control (ACC) system of the second aspect.

From a fourth aspect, the present disclosure provides a method of controlling differential cooling flow rate in an active clearance control (ACC) system for a gas turbine engine. The method comprises i) providing the valve assembly of any of the embodiments of the first aspect, and ii) actuating the shaft to rotate to provide a desired differential amount of cooling fluid flow through the first and second outlet ducts.

BRIEF DESCRIPTION OF THE DRAWINGS

Some embodiments of the disclosure will now be described by way of example with reference to the accompanying drawings in which.

DETAILED DESCRIPTION

Figure 1:
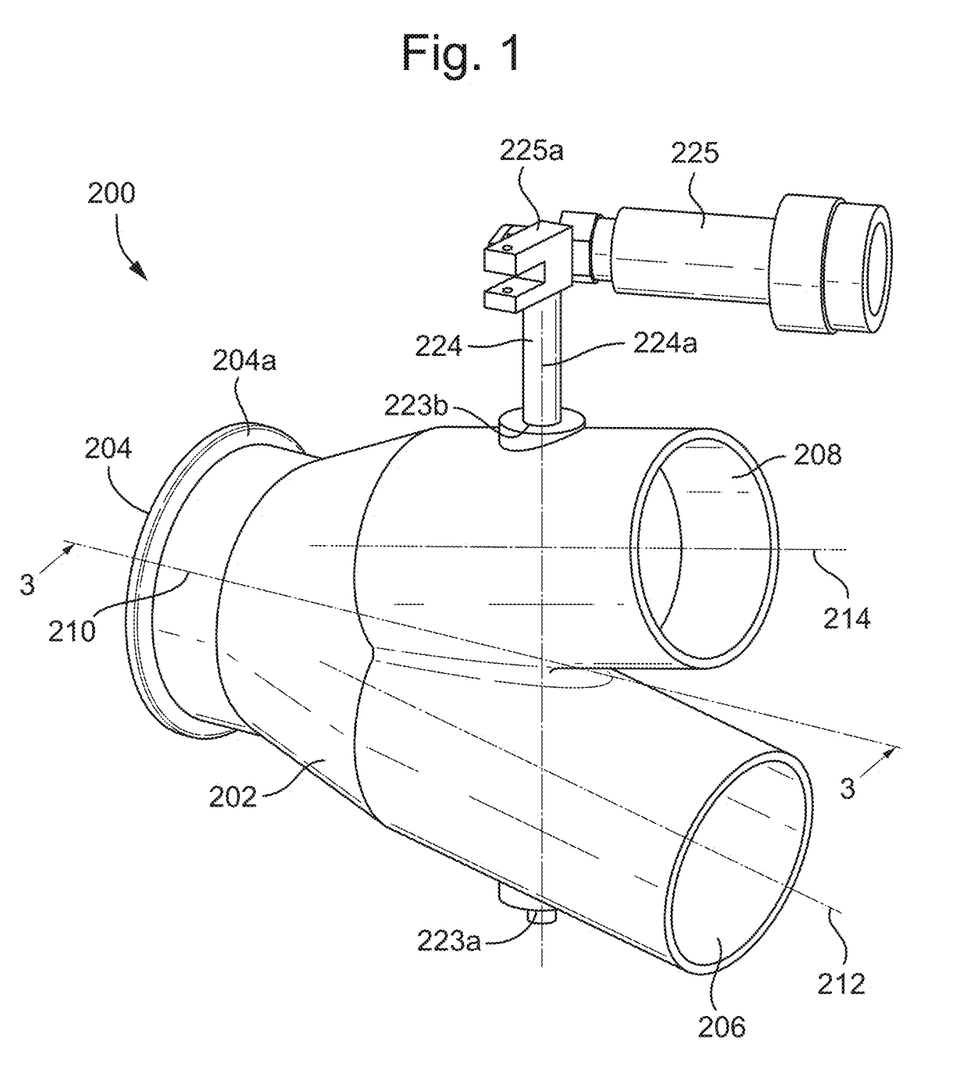
FIG. 1 shows a perspective view of a valve assembly according to the present disclosure.

FIG. 1 shows a valve assembly 200 according to the present disclosure. The valve assembly 200 can be used in an active clearance control (ACC) system, such as an ACC system in a gas turbine engine.

The valve assembly 200 has a housing 202 that defines an annular inlet duct 204, a first annular outlet duct 206, and a second annular outlet duct 208. The annular inlet duct 204 has a central inlet axis 210. The first annular outlet duct 206 has a first central outlet axis 212 and the second annular outlet duct 208 has a second central outlet axis 214.

The inlet duct 204 is configured to direct a flow of fluid to the first outlet duct 206 and the second outlet duct 208. In this manner, fluid flow from the inlet duct 204 is split between the first and second outlet ducts 206, 208. The inlet duct 204 may be configured to direct any suitable fluid to the outlet ducts 206, 208. In exemplary embodiments, the fluid is cooling air coming from engine bleed sources. Example bleed sources include a compressor of a gas turbine engine or a bypass duct of a gas turbine engine. However, the fluid could be obtained from any other suitable source. The inlet duct 204 also features an annular flange 204a for connection to a suitable fluid supply or other upstream ACC system component.

Figure 2:
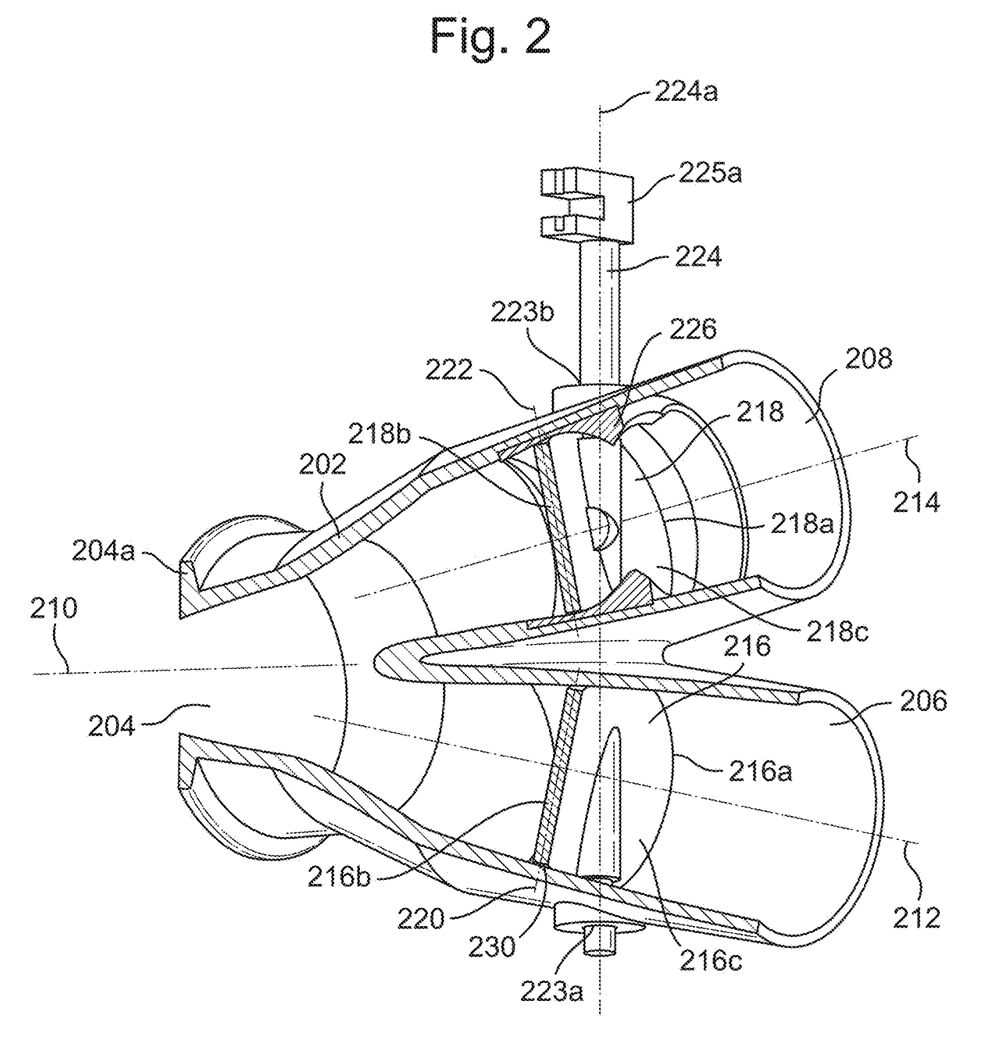
FIG. 2 shows a partial cutaway view of the valve assembly of FIG. 1 showing detail of the valve discs.
Figure 3:
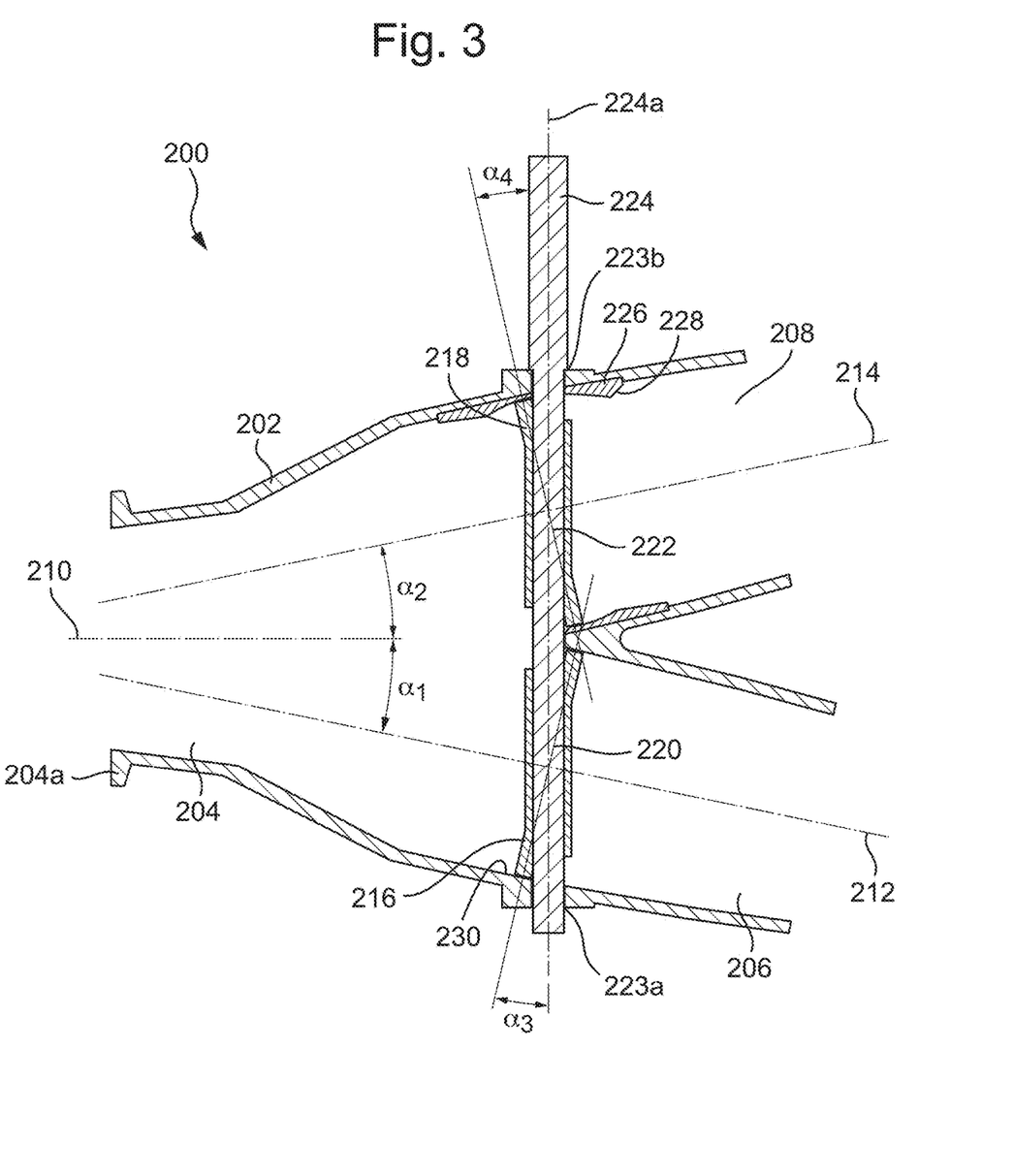
FIG. 3 shows a cross-sectional view of the valve assembly of FIG. 1 along line 3-3 with the valve discs in a first closed position.

Referring to FIGS. 2 and 3, a first valve disc 216 is positioned within the first outlet duct 206 and a second valve disc 218 is positioned within the second outlet duct 208. The valve discs 206, 208 form butterfly valves in the respective outlet ducts 206, 208.

The valve discs 206, 208 have a substantially circular profile. First and second radial planes 220, 222 pass through the centre of the first and second valve discs 216, 218, respectively. Each disc has a peripheral edge 216a, 218a (i.e. around its circumference), a front face 216b, 218b, and a rear face 216c, 218c opposing the front face 216b, 218b.

The first and second valve discs 216, 218 are configured to rotate between a first "closed" position and a second "fully-open" position, to vary the amount of fluid flow permitted through the first and second outlet ducts 206, 208 during operation.

FIG. 3 shows the valve discs 216, 218 in the first "closed" position. It is to be appreciated that during operation, the first "closed" position corresponds to a valve disc 216, 218 position where no or minimal intended fluid flow is permitted through the outlet ducts 206, 208 by the valve discs 216, 218. This may correspond to a position where the first and second valve discs 216, 218 are generally perpendicular to the first and second central outlet axes 212, 214, respectively. In other words, the radial planes 220, 222 of the first and second valve discs 216, 218 may be substantially perpendicular to the first and second central outlet axes 212, 214, respectively. In this manner, the front faces 216b, 218b of the valve discs 216, 218 are impinged by flow from the inlet duct 204 when the valve discs 216, 218 are in the first "closed" position. There may of course be other embodiments where the "closed" position (i.e. minimum intended fluid flow) is realised when the valve discs 216, 218 are not generally perpendicular to the first and second central outlet axes 212, 214, respectively. The scope of the present disclosure also extends to such embodiments.

It is to be appreciated that during operation, the second "fully-open" position corresponds to a valve disc 216, 218 position where maximum intended fluid flow is permitted through the outlet ducts 206, 208 by the valve discs 216, 218. This may correspond to a position where the first and second valve discs 216, 218 are generally parallel to the first and second central outlet axes 212, 214, respectively. In other words, the radial planes 220, 222 of the first and second valve discs 216, 218 may be substantially parallel to the first and second central outlet axes 212, 214, respectively. In this manner, both the front and rear faces 216b, 218b, 216c, 218c of the valve discs 216, 218 will minimally impinge on fluid flow through the first and second outlet ducts 206, 208. It is also to be appreciated that the angle between the first position and the second position may therefore be about 90° (e.g. +/−5°). There may of course be other embodiments where the "fully-open" position (i.e. maximum intended fluid flow) is realised when the valve discs 216, 218 are not be substantially parallel to the first and second central outlet axes 212, 214, respectively (e.g. when valve discs 216, 218 rotated less than about 90° from a generally perpendicular closed" position). The scope of the present disclosure also extends to such embodiments.

A shaft 224 is coupled to the first and second valve discs 216, 218 such that rotation of the shaft 224 rotates both the first and second valve discs 216, 218 within the first and second outlet ducts 206, 208, respectively. The shaft 224 defines a central shaft axis 224a. In this manner, rotation of the shaft 224 can be used to vary the amount of fluid flow permitted through the first and second outlet ducts 206, 208.

The shaft 224 passes through the housing 202 across the first and second outlet ducts 206, 208, and is rotatably mounted to the housing 202 at two opposing openings 223a, 223b through the housing 202 (i.e. openings 223a, 223b extend from the interior to the exterior of the housing 202 or, in other words, through the thickness of the housing 202). The shaft 224 may be rotatably mounted in the openings 223a, 223b using bearings or any other suitable means. The openings 223a, 223b, shaft 224 and/or bearings may also feature or provide a seal to prevent fluid leaking from the housing 202 via the openings 223a, 223b. It is to be appreciated that by requiring a single shaft 224 mounted in only two opposing openings 223a, 223b, the disclosed assembly may require fewer openings in the housing 202 than prior art valve assemblies. It is advantageous to have fewer openings as it reduces the number of bearings and/or seals required and generally simplifies the design of the valve assembly 200. There is also less potential for fluid leakage from the housing 202.

In an alternative embodiment (not shown), only one of the openings 223a, 223b is provided through the housing 202. The shaft 224 is then rotatably mounted at this one opening and at the housing 202 at the area that would have corresponded to the other of the depicted openings. This means the shaft 224 is enclosed in the housing 202 where the other opening would have been. Thus, this embodiment reduces the number of openings and seals required even further.

Referring again to FIG. 1, the valve assembly 200 has an actuator 225 operatively connected to the shaft 224, and configured to rotate the shaft 224 in response to actuation. The actuator 225 is configured to rotate the shaft 224 so that the valve discs 216, 218 can be rotated between the first position and the second position by a desired amount/angle/degree of rotation. As will be discussed in more detail below, this actuation allows a desired differential amount of cooling fluid flow through the first and second outlet ducts 206, 208 to be realised. The depicted actuator 225 is a linear actuator that utilises a cam mechanism 225a to impart rotatory motion to the shaft 224. However, within the scope of this disclosure, any other suitable type of actuator for imparting rotary motion to the shaft 224 may be used. For example, a rotary actuator may be operatively coupled to the shaft 224 instead.

Referring to FIG. 3, in the embodiment shown, the outlet ducts 206, 208 are angled relative to the inlet duct 204 such that the valve assembly 200 generally has a V-shape. The first central outlet axis 212 is disposed at a first acute angle $\alpha1$ relative to the central inlet axis 210, and the second central outlet axis 214 is disposed at a second acute angle $\alpha2$ relative to the central inlet axis 210. The second acute angle $\alpha2$ is equal and opposite to the first acute angle $\alpha1$. In exemplary embodiments, the angles $\alpha1$, $\alpha2$ range from 5° to 45°.

In the embodiment shown, the shaft axis 224a is perpendicular to the central inlet axis 210. The radial planes 220, 222 of the valve discs 216, 218 are offset relative to the shaft axis 224a by third and fourth acute angles $\alpha3$ and $\alpha4$, respectively. This offset maintains the first and second valve discs 216, 218 generally perpendicular to the first and second outlet axes 212, 214, respectively, in the first position. It is important that this relationship is maintained to enable to the valve discs 216, 218 to block substantially all of the fluid flow through the outlet ducts 216, 218 in the first position, and thus provide a closed condition for operation. Angles $\alpha3$ and $\alpha4$ also ensure that the shaft 224 can pass through the valve discs 216, 218 without interrupting their circumferential peripheral edges 216a, 218a, which also improves their outlet duct sealing properties in the fully closed condition. As with angles $\alpha1$, $\alpha2$, in exemplary embodiments, the angles $\alpha3$, $\alpha4$ range from 5° to 45°.

In the embodiment shown, the outlet ducts 206, 208 are symmetrically arranged relative to the inlet duct 204 and angles $\alpha1$, $\alpha2$, $\alpha3$ and $\alpha4$ are all equal. It will be appreciated that in other embodiments, the outlet ducts 206, 208 may be asymmetrically arranged relative to the inlet duct 204 with angle $\alpha1$ equal to $\alpha3$ and $\alpha2$ equal to $\alpha4$ in order to maintain the generally perpendicular relationship discussed above. In an alternative embodiment, the first and second outlet axes 212, 214 may be generally parallel to the inlet axis 210, and the radial planes 220, 222 of the valve discs 216, 218 may be generally parallel to the shaft axis 224a (i.e. angles $\alpha1$, $\alpha2$, $\alpha3$ and $\alpha4$ are all 0°).

In the embodiment shown, both outlet ducts 206, 208 (and valve discs 216, 218) have substantially the same diameter and the inlet duct 204 has a diameter that is larger than the diameter of the outlet ducts. However, in other embodiments, the inlet duct 204 may have a smaller diameter than one or more of the outlet ducts 206, 208 and/or the outlet ducts may be of different diameters, depending on the specific design application.

Referring to FIG. 3, a flow control member 226 in the second outlet duct 208 surrounds the second valve disc 218. The flow control member 226 is at least partially disposed in the outlet duct 208. In other words, part of the flow control member 226 may protrude from the opening of the second outlet duct 208 towards the inlet 204. In some embodiments, the flow control member 226 is entirely disposed within the outlet duct 208. The flow control member 226 is configured to restrict fluid flow passing through the second outlet duct 208 to a greater extent than the fluid flow passing through the first outlet duct 206 for a given degree of rotation of the first and second valve discs 216, 218 from the first position.

The flow control member 226 may comprise at least one flow restricting portion 228 that is configured to provide a reduced fluid flow area between the second valve disc 218 and the flow control member 226 compared to the fluid flow area between the first valve disc 216 and a portion 230 of the first outlet duct 206 surrounding the first valve disc 216, for a given degree of rotation of the first and second valve discs 216, 218 from the first position. As shown in FIGS. 4B, 5B and 6B, in the embodiment shown, the flow control member 226 has two flow restricting portions 228, one upstream of the shaft 224 and one downstream of the shaft 224. The flow restricting portion downstream of the shaft 224 may have geometry that is generally rotationally symmetric with the flow restricting portion upstream of the shaft 224. However, the flow restricting portions upstream and downstream can have different geometries depending on the differential cooling fluid flow relationship that is required for a specific application (as discussed below).

The flow restricting portions 228 are shaped to provide a predetermined differential relationship between the amount of fluid flow allowed to pass through the first outlet duct 206 and the second outlet duct 208 depending on the degree of rotation of the first and second valve discs 216, 218 from the first position.

Figure 4A:
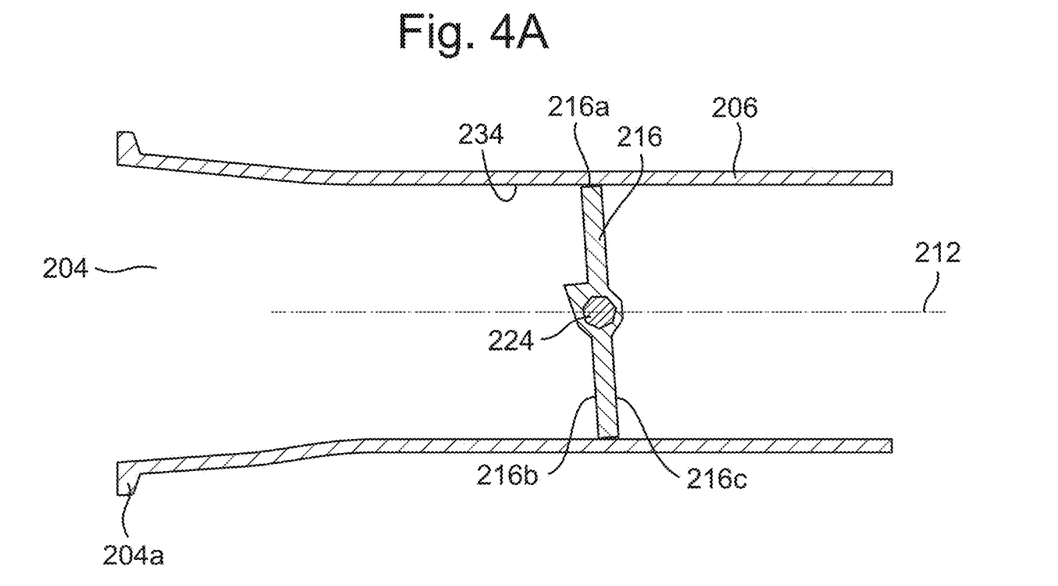
FIGS. 4A and 4B show cross-sectional views of FIG. 1 along central outlet axis 212 and 214, respectively.
Figure 4B:
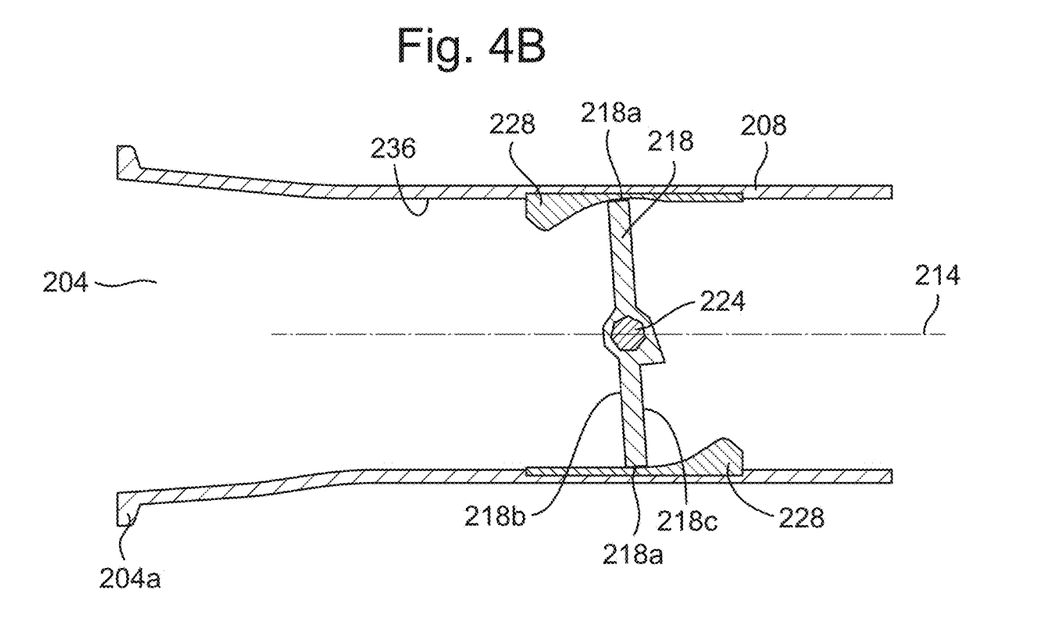

FIGS. 4A and 4B illustrate the first and second outlet ducts 206, 208, respectively, with the first and second valve discs 216, 218 in the first position. As discussed above, fluid flow through the first and second outlet ducts 206, 208 is substantially inhibited in the first position (i.e. minimal or no fluid flow is permitted through the outlet ducts 206, 208 in the first position).

In the embodiment shown, the first and second outlet ducts 206, 208 have substantially the same diameter as the first and second valve discs 216, 218, respectively, in order to block substantially all fluid flow therethrough in the first position. In alternative embodiments, one or more of the valve discs 216, 218 may be sized to have smaller diameters than their respective outlet ducts 206, 208 to establish a small clearance gap between the edges 216a, 218a of the first and second valve discs 216, 218 and the inner wall 234 of the first outlet duct 206 and flow control member 226 surrounding the valve discs 216, 218 in the first position. This clearance may allow a small/minimal amount of fluid to pass through the valves when in the first position. As will be appreciated by the skilled person, such clearance gaps may also be present due to manufacturing tolerances.

Figure 5A:
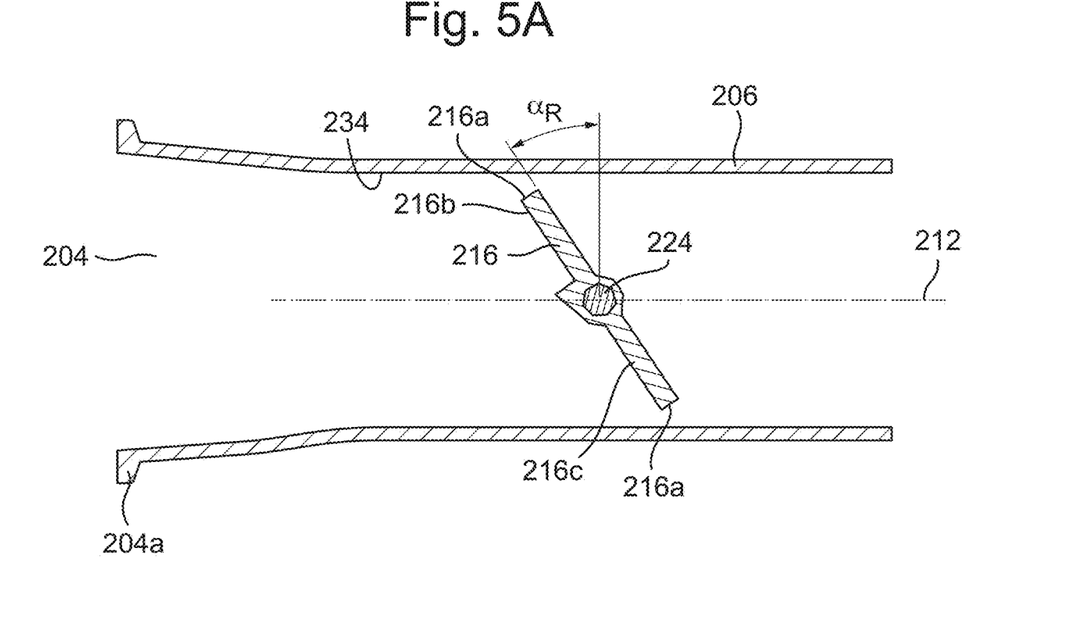
FIGS. 5A and 5B show the cross-sectional views of FIGS. 4A and 4B, respectively, but with the first and second valve discs rotated an angle αR from the first position.
Figure 5B:
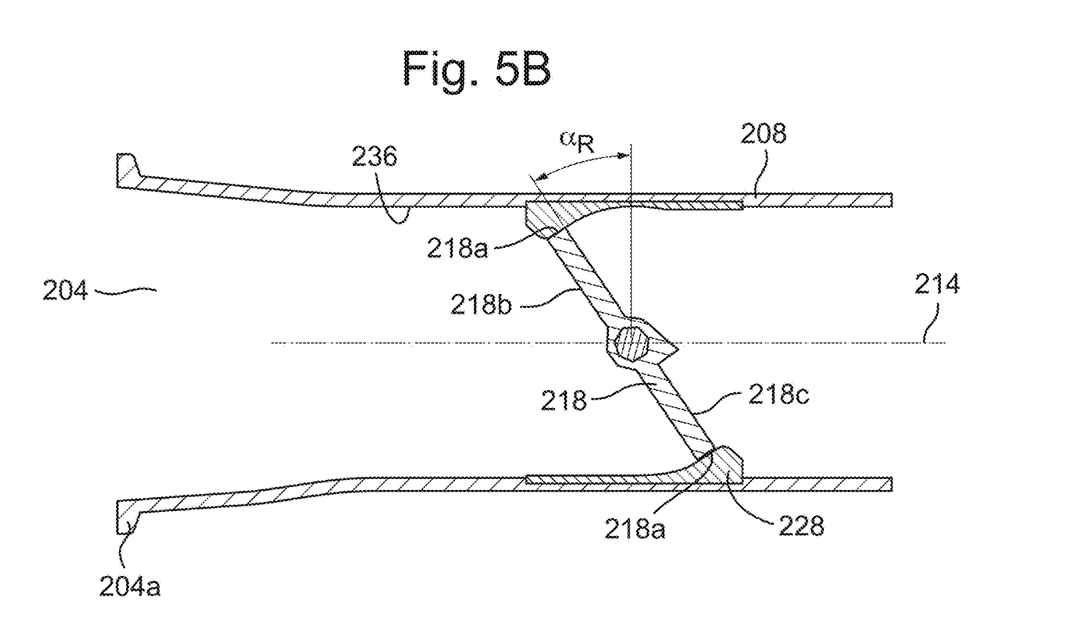

FIGS. 5A and 5B illustrate the first and second outlet ducts 206, 208, respectively, with the first and second valve discs 216, 218 rotated at an angle αR that is about 40° relative to the first position. In the first outlet duct 206, fluid is able to flow through a gap opened between the edge 216a of the first valve disc 216 and the inner wall 234 of the first outlet duct 206 surrounding the first disc valve 216. In the second outlet duct 208, the flow restricting portions 228 extend into the second outlet duct 208 such that there is substantially no gap between the flow restricting portions 228 and the edge 218a of the second disc 218. Therefore, fluid flow is still substantially inhibited in the second outlet duct 208, despite the valve disc 218 having been rotated around 40° from the first position. Therefore, a differential fluid flow is established though the first and second outlet ducts 206, 208.

Figure 6A:
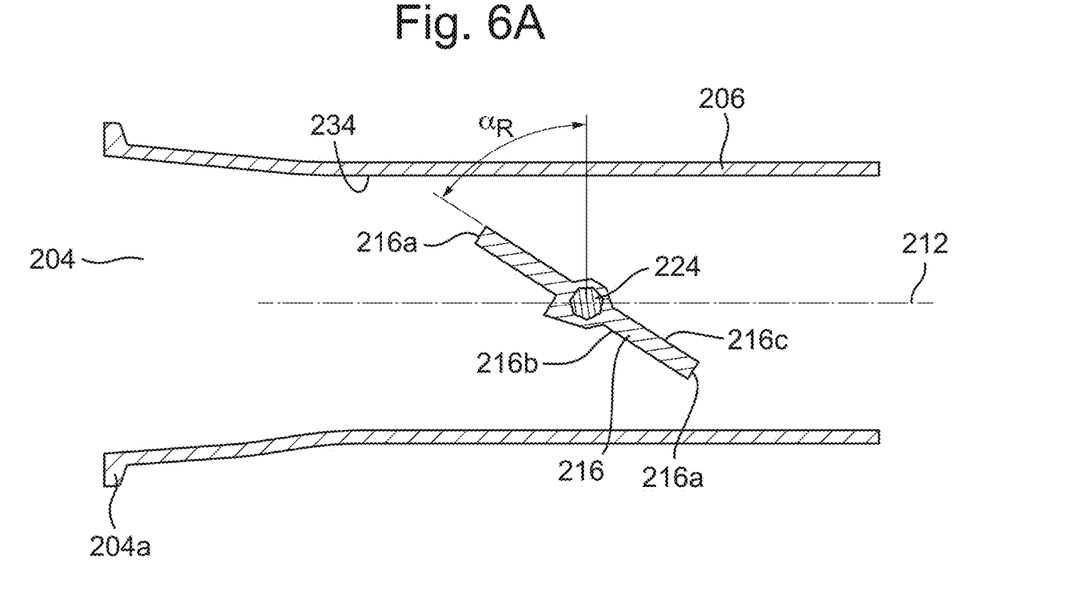
FIGS. 6A and 6B show the cross-sectional views of FIGS. 4A and 4B, respectively, but with the first and second valve discs rotated an angle αR from the first position.
Figure 6B:
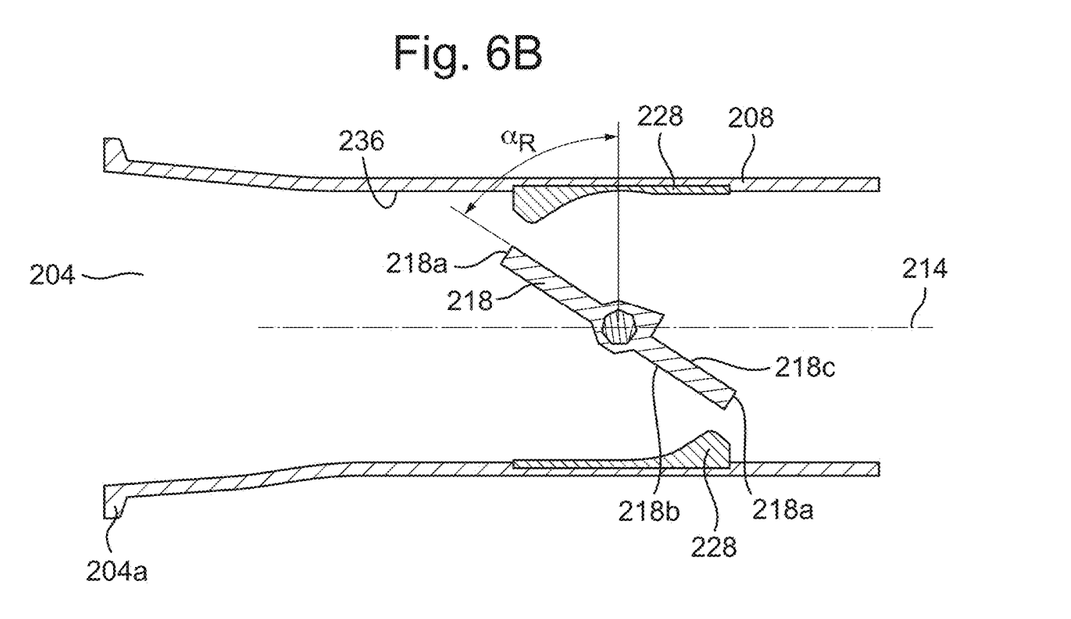

FIGS. 6A and 6B illustrate the first and second outlet ducts 206, 208, respectively, with the first and second valve discs 216, 218 rotated at an angle αR that is about 60° relative to the first position. In the first outlet duct 206, fluid is able to flow through a gap between the edge 216a of the first valve disc 216 and the inner wall 234 of the first outlet duct 206 surrounding the first disc valve 216. In the second outlet duct 208, fluid is now able to flow through a gap opened between the edge 218a of the second valve disc 218 and the flow restricting portions 228. The gap is smaller in the second outlet duct 208 than the first outlet duct 206, so the flow of fluid through the second outlet duct 208 is still restricted relative to the first outlet duct 206. Accordingly, a predetermined differential flow relationship between the first and second outlet duct 206, 208 depending on the rotation angle αR from the first position is established.

The flow control member 226 can have any suitable shape for achieving a desired differential flow relationship between the first outlet duct 206 and the second outlet duct 208. As discussed in more detail below, it is to be appreciated that the shape of the flow control member 226 and specifically the size and contour of the flow restricting portions 228 can be adapted to provide any suitable predetermined differential flow relationship between the first and second outlet ducts 206, 208 for a given angle αR of rotation of the first and second valve discs 216, 218 from the first position.

Figure 7:
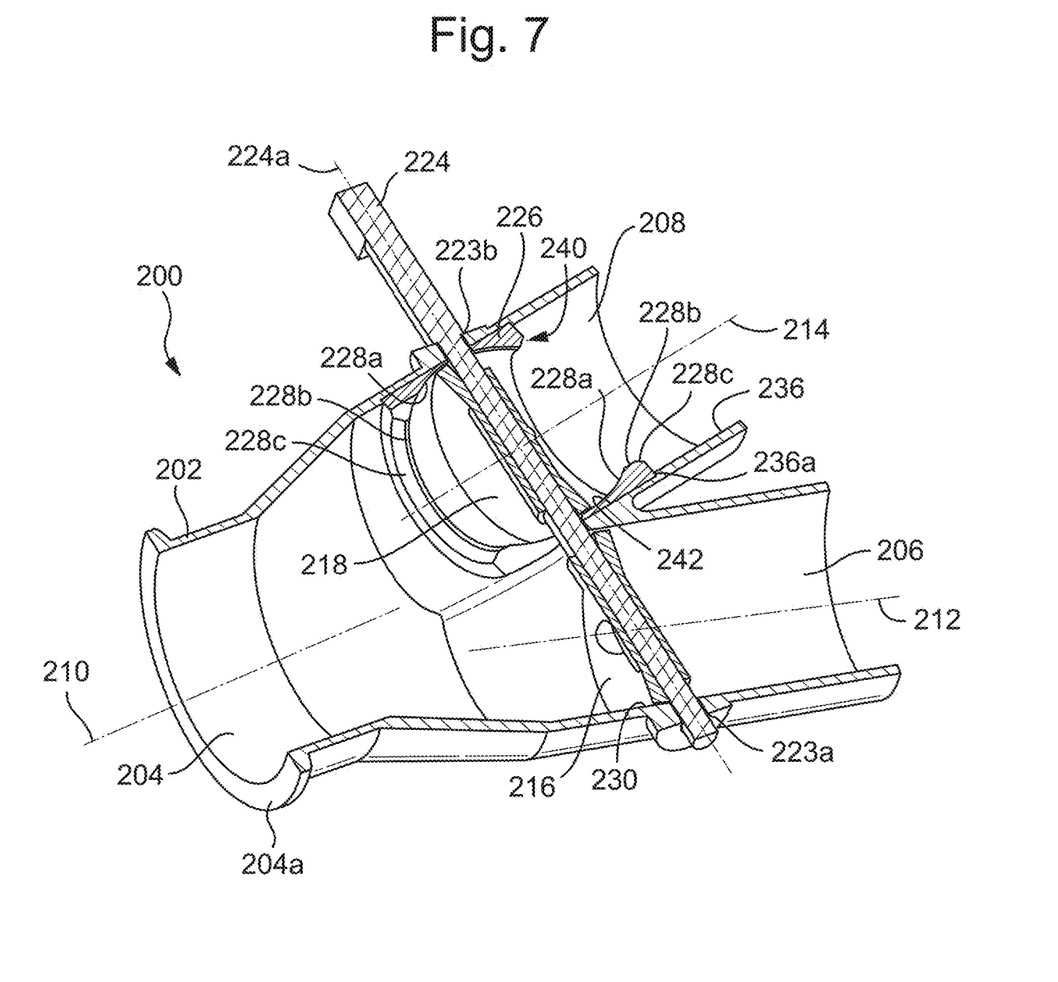
FIG. 7 shows a perspective view of the valve assembly shown in FIG. 3.

FIG. 7 shows further detail of the flow control member 226 of FIG. 3. In this embodiment, the flow control member 226 is an annular insert 240 that is separate from and disposed in the second outlet duct 208. The outer wall 242 of the insert 226 is generally cylindrical in shape and is secured in a recess 236a in the inner wall 236 of the second outlet duct 208. The insert 240 may be secured within the second outlet duct 208 in any suitable manner. For example, the insert 240 may be brazed or welded to the second outlet duct 208. In other embodiments, the outer wall 242 has substantially the same diameter as the inner wall 236 of the second outlet duct 208 and is secured therein, without the use of recess 236a. In such embodiments, the insert 240 may be interference fit into the second outlet duct 208.

The insert 240 comprises the flow restricting portions 228. The flow restricting portions 228 extend radially inwards towards the second outlet duct central axis 214 to interact with the peripheral edge 218a of the second valve disc 218. The degree of radial extension per unit axial length of the flow restricting portions 228 can be used to tailor the restriction in flow area provided between the second valve disc 218 and the insert 240 for a given degree or range of rotation αR of the second valve disc 218. This can be used to provide the desired predetermined differential flow relationship between the first duct 206 and the second duct 208.

A first portion 228a of the flow restricting portions 228 has a curved surface having an internal diameter that decreases further away from the shaft 224 to substantially follow the contour of the edge 218a of the second valve disc 218 as the second valve disc 218 rotates away from the first position. In the embodiment shown, minimal clearance is provided between the first portion 228a and the valve disc 218 such that fluid flow is substantially inhibited during a first desired angular range of rotation from the first position, in which the second valve disc 218 interacts with the first portion 228a.

A second portion 228b of the flow restricting portions 228 extends from the first portion 228a and has an internal diameter that is substantially constant. The second portion 228b provides a gradually increasing gap/flow area between the second valve disc 218 and the flow control member 226 as the valve disc 218 rotates a second desired angular range of rotation that is further from the first position than the first desired angular range. Accordingly, during this second desired range of rotation, the flow rate through the second outlet duct 208 gradually increases as the valve disc 218 rotates further from the first position.

A third portion 228c of the flow restricting portions 228 extends from the second portion 228b and has an internal diameter that increases generally linearly further away from the shaft 224. The third portion 228c provides an increasing gap/flow area between the second valve disc 218 and the flow control member 226 as the valve disc 218 rotates a third desired angular range of rotation that is further from the first position than the second desired angular range. Accordingly, during this third desired range of rotation, the flow rate through the second outlet duct 208 increases at a faster rate than in the second desired range of rotation as the valve disc 218 rotates further from the first position.

As the second valve disc 218 rotates further away from the third portion 228c of the flow control member 226 towards the second position, the flow control member 226 has less influence on the flow rate in the second outlet duct 208, and the flow rate continues to increase at a faster rate as the valve disc 218 rotates past the third desired range of rotation towards the second position.

As will be appreciated, the flow control member 226 restricts flow by interacting with the second valve disc 218 to reduce the flow area between the second valve disc 218 and the second outlet duct 208 at a given intermediate rotational position of the valve discs 216, 218 between the first position to the second position. By comparison, the first duct 206 does not include a flow control member, so the flow through the first duct 206 is greater than the flow through the second outlet duct 208 at the fully open and intermediate positions in the embodiment shown. The amount of differential flow between the first and second ducts 206, 208 in the fully open position can be varied by changing the diameter/cross-sectional area of the first duct 206 compared to the second duct 208 and the flow control member 226. For example, in another embodiment (not shown), the first duct 206 can be sized such that the flow rate through both ducts 206, 208 is substantially the same in the fully open position.

Different turbine areas may require different amounts of cooling to achieve optimum clearance between the turbine casing and the turbine blades. For example, an upstream stage of a turbine may require more cooling than a downstream stage because it is closer to the combustor exhaust. The reduced flow through the second outlet duct 208 can be used to cool a turbine area that requires less cooling than a turbine area that is cooled by the first outlet duct 206.

In some embodiments, the first and second outlet ducts 206, 208 may be used to cool different areas of the same turbine case section, such as different areas on a high pressure turbine or a low pressure turbine case section. In other embodiments, the first and second ducts 206, 208 may be used to cool areas of different turbine case sections. For example, the first outlet duct 206 may be used to cool an area of a high pressure turbine case section and the second outlet duct 208 may be used to cool an area of a low pressure turbine case section.

Although the embodiments shown depict two outlet ducts 206, 208, any number of additional outlet ducts (and corresponding valve discs) may be provided. As will be appreciated by the skilled person, the specific configuration will depend on the cooling requirements for a specific design application. For example, if more areas of the turbine case require cooling additional outlet ducts and valve discs may be provided.

It will be appreciated that the flow control member 226 described above is by way of example only and many possible embodiments of the flow control member 226 geometry are possible within the scope of this disclosure. For example, the flow restricting portions 228 may be shaped to reduce flow by a linear or non-linear amount over the axial length of the control member 226 to provide the desired differential relationship between the flow rate through the first outlet duct 206 and the second outlet duct 208.

Utilising a flow control member 226 as described above may enable more complex differential flow relationships between the first outlet duct 206 and the second outlet duct 208 than was possible with known valve assemblies utilising other arrangements for flow relationship control.

Figure 8:
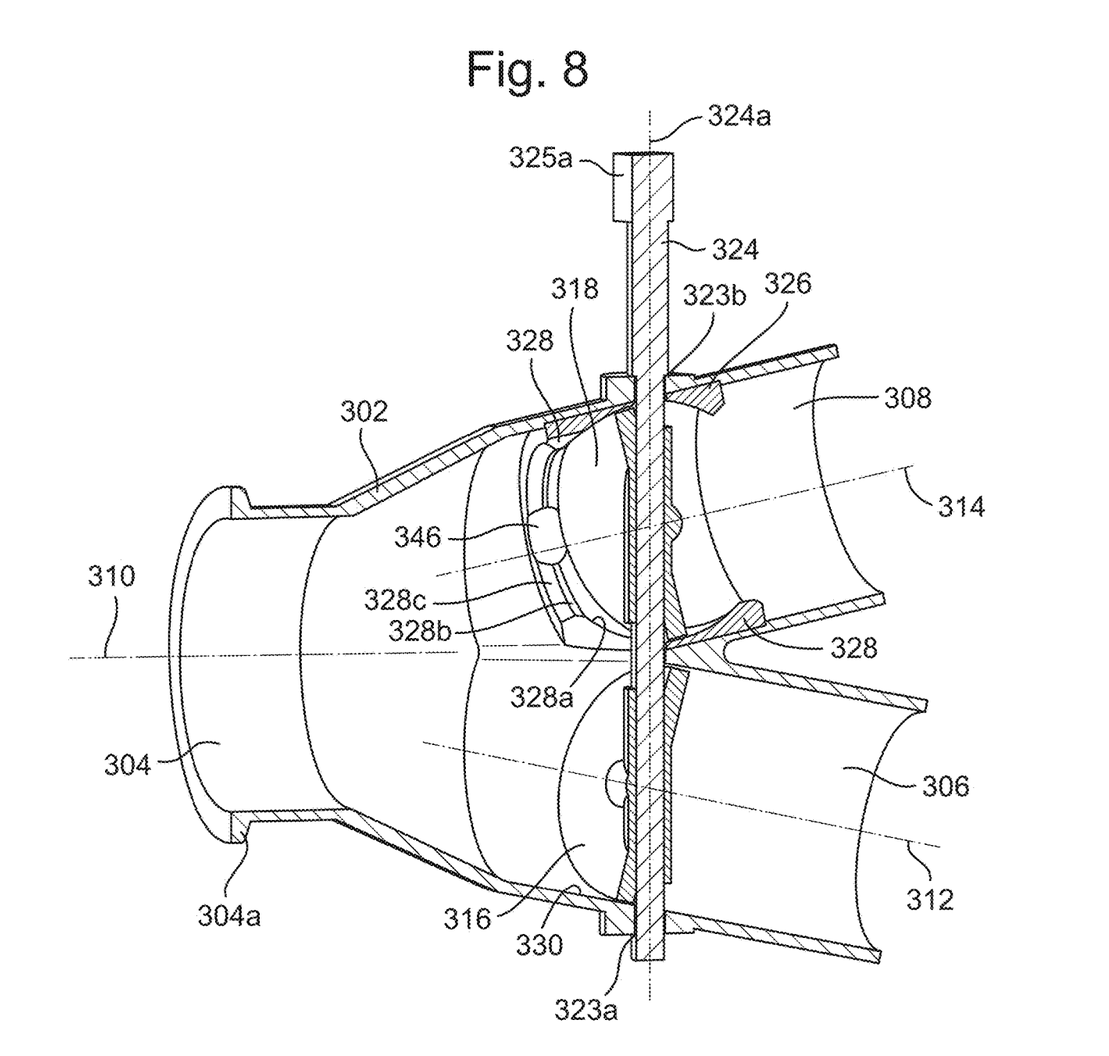
FIG. 8 shows an alternative embodiment of a valve assembly in accordance with the present disclosure.

FIG. 8 shows an alternative embodiment of a valve assembly 300. The features and functionality of the valve assembly 300 are the same as for the valve assembly 200 shown in FIGS. 1 to 7, except that the flow restricting portions 328 of the valve assembly 300 include at least one notch 346. Like numbers indicate like parts, with the addition of 100.

The notch 346 is configured to provide a step increase in flow area between the second valve disc 318 and the flow control member 326 at a predetermined angle of rotation $\alpha R$ of the second valve disc 318 from the first position.

The notch 346 provides a step increase in flow through the second outlet duct 308 as the second valve disc 318 rotates over it from the first position. This is because the notch 346 provides a sudden increase in the gap/flow area between the valve disc 318 and the control member 326. It is to be appreciated that in combination with the first, second and third portions 328a, 328b, 328c of the control member 326, the notch 346 can be used to provide a more complex differential flow relationship between the first and second ducts 306, 308, as may be required for a particular design application.

In a further embodiment, the insert 240, 340 may comprise two half-rings instead of a single annular part as illustrated in FIGS. 7 and 8.

Valve assemblies 200, 300 having a separate insert 240, 340 may advantageously allow the insert 240, 340 to be replaced to enable easier maintenance and adjustments to the differential flow relationship.

Figure 9:
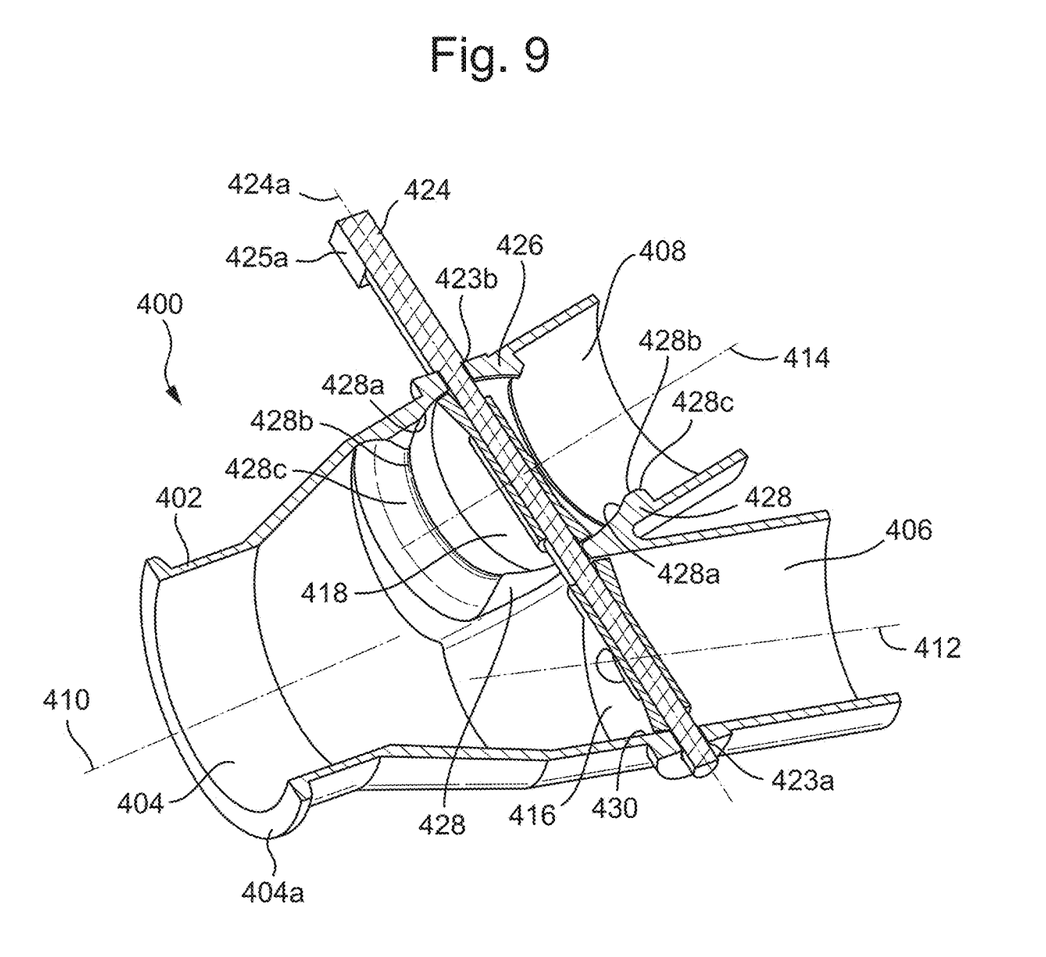
FIG. 9 shows another alternative embodiment of a valve assembly in accordance with the present disclosure.

FIG. 9 shows an alternative embodiment of a valve assembly 400. The features and functionality of the valve assembly 400 are the same as for the valve assembly 200 shown in FIGS. 1 to 7, except that the flow control member 426/flow restriction portions 428 are integrally formed with the housing 402 instead of being formed in a separate insert. Like numbers indicate like parts, with the addition of 200.

The valve assembly 400 with integrally formed flow restricting portions 428 may be easier to manufacture, may have reduced weight and may require less maintenance compared with a valve assembly having a separate insert.

Within the scope of the present disclosure, the insert 240, 340 and housing 402 with integral flow restricting portions 428 can be formed in any suitable manner. However, in particular embodiments, they are made using additive manufacturing, which advantageously enables complex geometries to be manufactured with more precision and in a relatively cost-effective manner.

It will be appreciated that the above embodiments are exemplary only and that modifications thereto may be made within the scope of the disclosure.

The invention claimed is:

1. A valve assembly for an active clearance control (ACC) system in a gas turbine engine, comprising:
  a housing defining an annular inlet duct having a central inlet axis, a first annular outlet duct having a first central outlet axis, and a second annular outlet duct having a second central outlet axis;
  wherein the inlet duct is configured to direct a flow of fluid to the first outlet duct and the second outlet duct;
  a first valve disc positioned within the first outlet duct;
  a second valve disc positioned within the second outlet duct;
  a shaft coupled to the first and second valve discs such that rotation of the shaft rotates both the first and second valve discs within the first and second outlet ducts, respectively, wherein the first and second valve discs are configured to rotate between a first closed position and a second fully-open position to vary the amount of fluid flow permitted through the first and second outlet ducts; and a flow control member in the second outlet duct surrounding the second valve disc, wherein the flow control member is configured to restrict fluid flow passing through the second outlet duct to a greater extent than the fluid flow passing through the first outlet duct for a given degree of rotation of the first and second valve discs from the first position.

2. The valve assembly of claim 1, wherein the flow control member comprises at least one flow restricting portion that is configured to provide a reduced fluid flow area between the second valve disc and the flow control member compared to the fluid flow area between the first valve disc and a portion of the first outlet duct surrounding the first valve disc, for a given degree of rotation of the first and second valve discs from the first position.

3. The valve assembly of claim 2, wherein the at least one flow restricting portion is shaped to provide a predetermined differential relationship between the amount of fluid flow allowed to pass through the first outlet duct and the second outlet duct depending on the degree of rotation of the first and second valve discs from the first position.

4. The valve assembly of claim 3, wherein the at least one flow restricting portion includes at least one notch that is configured to provide a step increase in flow area between the second valve disc and the flow control member at a predetermined angle of rotation of the second valve disc from the first position.

5. The valve assembly of claim 1, wherein the first central outlet axis is disposed at a first acute angle ($\alpha_1$) relative to the central inlet axis, and the second central outlet axis is disposed at a second acute angle ($\alpha_2$) relative to the central inlet axis, wherein the second acute angle ($\alpha_2$) is equal and opposite to the first acute angle ($\alpha_1$).

6. The valve assembly of claim 5, wherein the shaft defines a central shaft axis that is perpendicular to the central inlet axis, and extends across the first and second and outlet ducts.

7. The valve assembly of claim 6, wherein the shaft is rotatably mounted to the housing at two opposing openings through the housing.

8. The valve assembly of claim 6, wherein the shaft is rotatably mounted to the housing at a single opening through the housing.

9. The valve assembly of claim 1, wherein the flow control member is an insert that is disposed in the second outlet duct.

10. The valve assembly of claim 9, wherein the insert is formed by additive manufacturing.

11. The valve assembly of claim 1, wherein the flow control member is integrally formed with the housing.

12. The valve assembly of claim 11, wherein the the housing and integral flow control member are formed by additive manufacturing.

13. The valve assembly of claim 1, further comprising:
an actuator operatively connected to the shaft, and configured to rotate the shaft in response to actuation.

14. An active clearance control (ACC) system for a gas turbine engine, comprising the valve assembly of claim 1.

15. A gas turbine engine comprising the active clearance control (ACC) system of claim 14.

16. A method of controlling differential cooling flow rate in an active clearance control (ACC) system for a gas turbine engine, comprising:
providing the valve assembly of claim 1; and
actuating the shaft to rotate to provide a desired differential amount of cooling fluid flow through the first and second outlet ducts.

* * * * *